(12) United States Patent
Fuechsel et al.

(10) Patent No.: US 8,667,858 B2
(45) Date of Patent: Mar. 11, 2014

(54) STEERING GEAR HAVING A FIXED BEARING AND A FLOATING BEARING FOR A SCREW PINION

(75) Inventors: Dennis Fuechsel, Schwaebisch Gmuend (DE); Jens Hafermalz, Waeschenbeuren (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/489,039

(22) Filed: Jun. 5, 2012

(65) Prior Publication Data
US 2012/0272765 A1 Nov. 1, 2012

Related U.S. Application Data

(63) Continuation of application No. PCT/EP2010/069344, filed on Dec. 10, 2010.

(30) Foreign Application Priority Data

Dec. 15, 2009 (DE) .......................... 10 2009 054 655

(51) Int. Cl.
*F16C 27/00* (2006.01)
*F16H 35/00* (2006.01)

(52) U.S. Cl.
USPC ..................................... 74/388 PS; 384/535

(58) Field of Classification Search
USPC ...... 74/388 PS, 416, 425; 384/535, 536, 581, 384/582
See application file for complete search history.

(56) References Cited

U.S. PATENT DOCUMENTS

| | | | |
|---|---|---|---|
| 1,064,912 A * | 6/1913 | Johansson | 384/535 |
| 1,510,303 A * | 9/1924 | Bugatti | 384/535 |
| 4,872,767 A | 10/1989 | Knapp | |
| 7,048,088 B2 | 5/2006 | Bernhard et al. | |
| 7,686,515 B2 | 3/2010 | Schust | |
| 7,748,492 B2 * | 7/2010 | Iwasa et al. | 180/444 |
| 2001/0040067 A1 | 11/2001 | Murakami et al. | |
| 2004/0222036 A1 | 11/2004 | Berhard et al. | |
| 2005/0161277 A1 | 7/2005 | Bock et al. | |
| 2007/0102228 A1 | 5/2007 | Shiina et al. | |
| 2008/0066992 A1 | 3/2008 | Bareis et al. | |
| 2008/0199114 A1 | 8/2008 | Schust | |

FOREIGN PATENT DOCUMENTS

| | | |
|---|---|---|
| DE | 93 01 334 | 4/1993 |
| DE | 101 61 715 | 6/2003 |
| DE | 102 17 123 | 12/2003 |
| DE | 10 2005 017 883 | 10/2006 |
| DE | 10 2005 035 020 | 2/2007 |
| DE | 602 10 154 | 3/2007 |

(Continued)

*Primary Examiner* — Justin Krause
(74) *Attorney, Agent, or Firm* — Jordan and Hamburg LLP

(57) ABSTRACT

A steering gear comprises a shaft bearing configuration which comprises a mounting which is installed in a housing section of the steering gear and has openings that enable a pivoting movement by an annular section of the mounting which is assembled with a first rolling bearing, and the mounting comprises a disk-shaped section, which is provided with the openings and relative to which the annular section can be pivoted, wherein the annular section is either assembled with the outer ring of the first rolling bearing and the disk-shaped section is attached to the housing section, or the annular section is assembled with the inner ring of the first rolling bearing and the disk-shaped section is attached to the shaft.

18 Claims, 33 Drawing Sheets

(56) References Cited

FOREIGN PATENT DOCUMENTS

| | | |
|---|---|---|
| DE | 10 2007 023 456 | 11/2008 |
| DE | 10 2008 001 878 | 11/2009 |
| FR | 2 173 867 | 10/1986 |
| FR | 2 891 036 | 3/2007 |
| FR | 2 911 171 | 7/2008 |
| GB | 8 89 280 | 2/1962 |

* cited by examiner

STEERING GEAR HAVING A FIXED BEARING AND A FLOATING BEARING FOR A SCREW PINION

This is a Continuation of U.S. National Stage of PCT/EP2010/069344 Filed Dec. 10, 2010.

BACKGROUND OF THE INVENTION

The invention relates to a steering gear according to the preamble of claim 1 and to a steering system equipped therewith. The invention in particular relates to a steering gear which is designed as a helical gear mechanism or a worm gear mechanism for an electric power steering system.

A steering gear of the type in question in the form of a helical gear mechanism for use in an electric power steering system is known from DE 101 61 715 A1. FIG. 1 shows the known helical gear mechanism 1, which is designed as a worm gear mechanism comprising a housing 2, in which a worm 3 and a worm gear 4 are disposed, wherein the worm 3 is connected by means of a coupling 8 to the drive shaft 9 of an electric drive motor 10, the shaft being mounted in a bearing 11. In this known design, the worm shaft is mounted in a shaft bearing 5, which comprises a ball bearing 6 in the form of a four-point bearing and is designed as a swiveling bearing, whereby the interlocking play between the worm 3 and the worm gear 4 can be kept constant during the entire service life of the gear mechanism. For this purpose, a preload force acts radially on the worm 3 and the worm is permanently pressed against the toothing of the worm gear 4 or helical gear. This is done by means of a preload device, which comprises a preload spring 13 and a pressure device 12 so as to cause engagement between the worm 3 and the worm gear 4 without play, and compensate for the operating forces that occur. The pressure device 12 can, for example, be provided with a hydraulic device 14 and a pressure piece 15 actuated thereby, the pressure piece directly acting on the bearing 16 or the worm 3. This allows for the wear which occurs over the service life to be automatically compensated for, whereby the tooth flank play is not increased to the extent possible and vibration noise is prevented. However, it has been shown such a known design may also create noise at the shaft bearing 5, wherein the noise can be eliminated here only conditionally through the use of an expensive specialty bearing.

DE 602 10 154 T2 describes a steering system comprising a worm gear mechanism. The design described there likewise comprises a fixed bearing, which is configured as a pivot bearing. The floating bearing likewise comprises a pressure piece. As a result, a customary steering gear comprising a helical pinion or worm is described here as well.

At the drive-side end, these customary steering gears comprising helical pinions (worm) thus comprise a shaft bearing configuration designed as a fixed bearing, in which a first rolling bearing (ball bearing) is provided. At the free end of the helical pinion (worm), a bearing device, which is designed as a floating bearing and comprises a second rolling bearing, is provided. This is intended to prevent, or at least drastically reduce, the development of noise, as efficiently as possible, both on the fixed bearing side and on the floating bearing side.

In addition, shaft bearing configurations comprising rolling bearings or ball bearings are known, in which the outer ring of the ball bearing is received in a sliding bearing, or in which the inner ring of the ball bearing is received in what is known as silent bushings, whereby the shaft is likewise pivotably mounted. However, these solutions are complex to implement and have relatively large play, which in turn results in the development of noise, notably during load changes (changes in steering). Moreover, these shaft bearing configurations are susceptible to temperature fluctuations and the service life thereof is not long.

The published patent application FR 2 891 036 describes a steering system comprising a recirculating ball steering gear, in which the shaft bearing configuration (see FIGS. 3-6 there) is improved by means of a mounting produced from one material, whereby two annular sections (24 and 25) are formed, which are connected to each other solely via narrow lands (26), wherein the inner annular section receives the rolling bearing for the shaft bearing configuration and the outer annular section is installed in the housing. Because of the narrow lands, the inner section can be easily pivoted relative to the outer section (see FIG. 6), whereby certain elasticity is attained in the shaft bearing configuration of a recirculating ball gear. A connection to helical gear mechanisms is not established there.

However, the focus in modern steering systems comprising helical gear mechanisms must be increasingly directed to improved noise reduction and effective mechanical action (interlocking).

SUMMARY OF THE INVENTION

It is therefore the object of the invention to considerably improve the steering gears of the type mentioned above and the shaft or helical pinion bearing configurations thereof. This is intended to overcome the aforementioned drawbacks of the conventional solutions. In addition, a method for producing a mounting for such a shaft bearing configuration is to be proposed.

The invention thus proposes a steering gear comprising a helical pinion (comprising a worm, for example), in which the shaft bearing configuration comprises a mounting, which is installed in a housing section of the steering gear and has openings that enable a pivoting movement by an annular section of the mounting which is assembled with the first rolling bearing, and in which the mounting comprises a disk-shaped section, which is provided with the openings, and relative to which the annular section can be pivoted, wherein the annular section is either assembled with the outer ring of the first rolling bearing and the disk-shaped section is attached to the housing section, or the annular section is assembled with the inner ring of the first rolling bearing and the disk-shaped section is attached to the shaft.

On the fixed bearing side, a shaft bearing configuration is thus proposed in which the rolling bearing is not installed directly in the housing section, but in which a mounting for the rolling bearing is provided, which comprises two sections and, by means of openings, exhibits elasticity that is created between the sections and reduces the noise of the shaft bearing configuration. One section of the mounting has an annular shape and is assembled with one of the bearing rings (outer or inner ring) of the rolling bearing. The other section has a disk-shaped design and can be pivoted relative to the annular section because of the openings. This disk-shaped section is installed in the housing section when the annular section receives or encloses the outer ring of the rolling bearing, or the disk-shaped section is connected to the shaft when the annular section carries the inner ring. Both alternatives are based on the same principle, which is to say to install an elastic mounting for the rolling bearing on the fixed bearing side, the mounting being installed either between the rolling bearing and the housing, or between the rolling bearing and the shaft. In other words: the openings provided in the mounting lend definable elasticity to the mounting, whereby at least the section of the mounting which holds the outer ring or inner ring of the rolling bearing (for example, of a ball bearing) is able to carry out a movement, and preferably a slight pivoting movement.

The pivoting movement preferably causes torsion of transition regions that form between the openings, wherein the torsion of the transition regions causes the helical pinion to be spring-loaded into the helical gear. For this purpose, an offset may be provided on or in the mounting, the offset in the assembled state of the steering gear causing a pivoting movement of the helical pinion in relation to the helical gear, wherein the pivoting movement is spring-loaded by the torsion. In addition, an offset can be provided at least in one of the bearings, and more particularly on or in the fixed bearing, the offset being such that, in the assembled state of the steering gear, the offset causes a pivoting movement of the helical pinion in relation to the helical gear, the pivoting movement being spring-loaded by the torsion. As an alternative or in addition, the helical pinion and/or the helical gear can be dimensioned with respect to each other such that an offset of this type is formed. A center distance is created between the helical pinion and helical gear at least by the fixed bearing, the center distance being smaller than a customary center distance by the amount of the offset. A center distance that is smaller than the center distance of the gear mechanism which is theoretically required for interlocking will thus also cause such an offset. After assembly of the gearbox, this axial offset, in conjunction with the spring washer, the transition regions of which are twisted, will always create a spring-loading force of the helical pinion in the direction of the helical gear.

The mounting provided on the fixed bearing side preferably has a multi-piece design, wherein the annular section is produced as a first piece from a first material, and more particularly from a soft sheet metal, and the disk-shaped section is produced as a second piece from a second material, and more particular from spring steel sheet. The mounting can thus also be produced by assembling several parts or sections, wherein these should, in each case, be produced from materials which are optimal for the function of the respective part or section. The disk-shaped section, which should exhibit certain elasticity, is produced in particular from spring steel sheet, for example, in the shape of a spring washer. All parts or sections can be produced cost-effectively from corresponding sheet metal.

A bearing device is preferably designed on the floating bearing side, which is to say at the free shaft end of the helical pinion or worm, the bearing device comprising a rolling bearing (the second rolling bearing), which is disposed in a bearing inner ring, which in turn is joined by means of a land, and more particularly an elastic land element, to a bearing outer ring disposed in the housing section. The bearing inner ring is designed as a first bushing or inner bushing receiving the second rolling bearing. The bearing outer ring is designed as a second bushing or outer bushing receiving the inner bushing, wherein a distance or space bridged by the land or land element is formed between the bushings.

Moreover, at least one elastic stop element, notably one that is produced from elastomer, can be disposed in the bearing outer ring or outer bushing, the bearing inner ring or the inner bushing striking against this stop element, notably during load changes that occur in the steering gear. At least one of the stop elements can be designed as a spring element that pushes on the rolling bearing, at least during a load change.

As a result of these measures, defined elasticity is introduced in the floating bearing, noise is limited, and the engagement of the helical pinion with the helical gear is improved.

In this context, it is advantageous for the gradient of the spring characteristics of the spring element to be lower in one region and greater in another region. The spring element can also be produced from an elastomer. The feature of the "spring element" should thus be understood as an elastic element in general terms, and is not restricted to a spring in the narrow sense. It is also conceivable to combine materials having differing spring characteristics, or coefficients of elasticity, with each other when producing the spring element.

Both measures, both on the fixed bearing side and on the floating bearing side, act together in a combinatorial way in a particularly advantageous manner. They can be implemented cost-effectively, can be quickly adapted to the design and performance-related requirements of the steering gear (material selection for fixed bearing parts or sections and/or adaptation of the spring characteristic for the floating bearing) and considerably reduce noise. Moreover, toothing engagement is considerably improved.

The invention further relates to a steering system which is equipped with such a steering gear and which is notably designed as an electric power steering system.

The invention further relates to a method for producing a mounting for such a shaft bearing configuration, wherein the mounting is produced from a disk-shaped or lug-shaped section part (made of spring steel sheet, for example) and an annular or crucible-shaped section part (made of soft sheet metal, for example) by positively and/or non-positively connecting the two section parts to each other. Apertures may be provided for this purpose, for example in the lug-shaped section part, through which material of the annular or crucible-shaped section part is pushed from one side and subsequently formed from the opposite side, whereby the two section parts are connected to each other by positive fit and/or non-positive fit. The mounting preferably has a multi-part design, wherein the openings weaken the transition regions between the sections, whereby the sections can be elastically moved relative to each other. To this end, the mounting preferably has a disk-shaped or lug-shaped section for attachment in the housing section of the steering system and comprises a crucible-shaped section for receiving the outer ring of the ball bearing. In this context, it is advantageous when the openings in the disk-shaped or lug-shaped section are designed as two mutually opposing, circular segment-shaped openings, which in each case enclose a region of the crucible-shaped section. The circular segment-shaped openings can, in each case, enclose a region of the crucible-shaped section to an extent at which two mutually opposing land-shaped transition regions remain in the disk-shaped or lug-shaped section. Moreover, the mutually opposing land-shaped transition regions can constitute a semicardanically elastic connection between the sections.

A definable material reduction is thus provided between the disk-shaped or lug-shaped section and the crucible-shaped section receiving the ball bearing. Two mutually opposing transition regions are formed, which act in the manner of a semicardanic suspension of the crucible-shaped section, whereby this section is connected to the disk-shaped or lug-shaped section in an elastically pivotable manner.

Preferably, at least the disk-shaped or lug-shaped section of the mounting is produced from sheet metal, and more particularly from spring steel sheet. Moreover, preferably at least the crucible-shaped section comprises a cylindrical housing, which in particular is formed from soft sheet metal and which encloses the outer ring of the ball bearing. The mounting preferably has a multi-piece design and therefore has at least one section formed from spring steel sheet and a section formed from soft sheet metal.

Using an elastically deformable material, the disk-shaped or lug-shaped section is thus designed as an elastic disk or spring washer. In contrast, using a plastically deformable material, the crucible-shaped section is designed as a receiving space that is optimized for the ball bearing.

Moreover, it is advantageous to provide the housing section of the steering system with at least one elastic damping element against which the axially movable mounting strikes. This additionally dampens the seat of the spring washer in the axial direction.

The mounting, notably the disk-shaped or lug-shaped section, can be fixed in the housing section by means of an adjusting screw and/or a threaded ring. Moreover, the disk-shaped or lug-shaped section may have an outer groove and/or an outer bead. The mounting is thus fixed in the housing section with a definable force, allowing the same to be optimally oriented for the aforementioned cardanic suspension.

The mounting, and more particularly the crucible-shaped section, can also be formed directly on the outer ring of the ball bearing. In addition, the ball bearing can be designed as a four-point bearing.

These and additional advantageous refinements and embodiments of the invention will be apparent from the dependent claims and the exemplary embodiment described hereafter and shown schematically based on the drawings.

DESCRIPTION OF THE PREFERRED EMBODIMENTS

The embodiments in FIGS. 2 to 13 show exemplary preferred design variants of shaft bearing configurations on the fixed bearing side which are designed according to the invention. The embodiments illustrated in FIG. 20 exemplary preferred design variants of shaft bearing configurations on the floating bearing side which are designed according to the invention. FIG. 21 illustrates the cooperation of the two bearing configurations. All design variants can be implemented either alone or in combination with each other, which is to say by combining a certain fixed bearing variant with a certain floating bearing variant, notably in a steering gear that is designed as a worm gear mechanism. The worm gear mechanism is preferably used in an electric power steering system. However, the invention is not limited to worm or helical gear mechanisms in particular, but rather can be applied in general to any type of steering gear.

Figure 1:
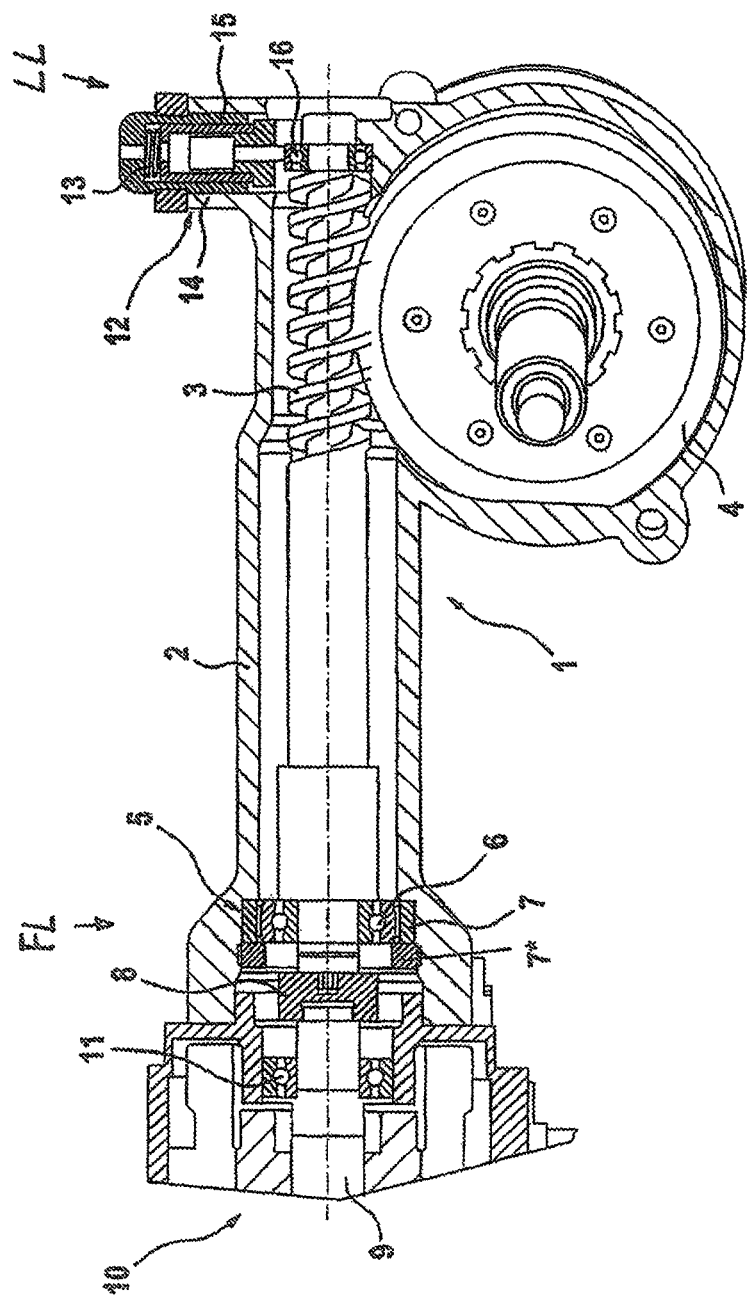
FIG. 1 shows a known helical gear mechanism for use in an electric power steering system.
Figure 2A:
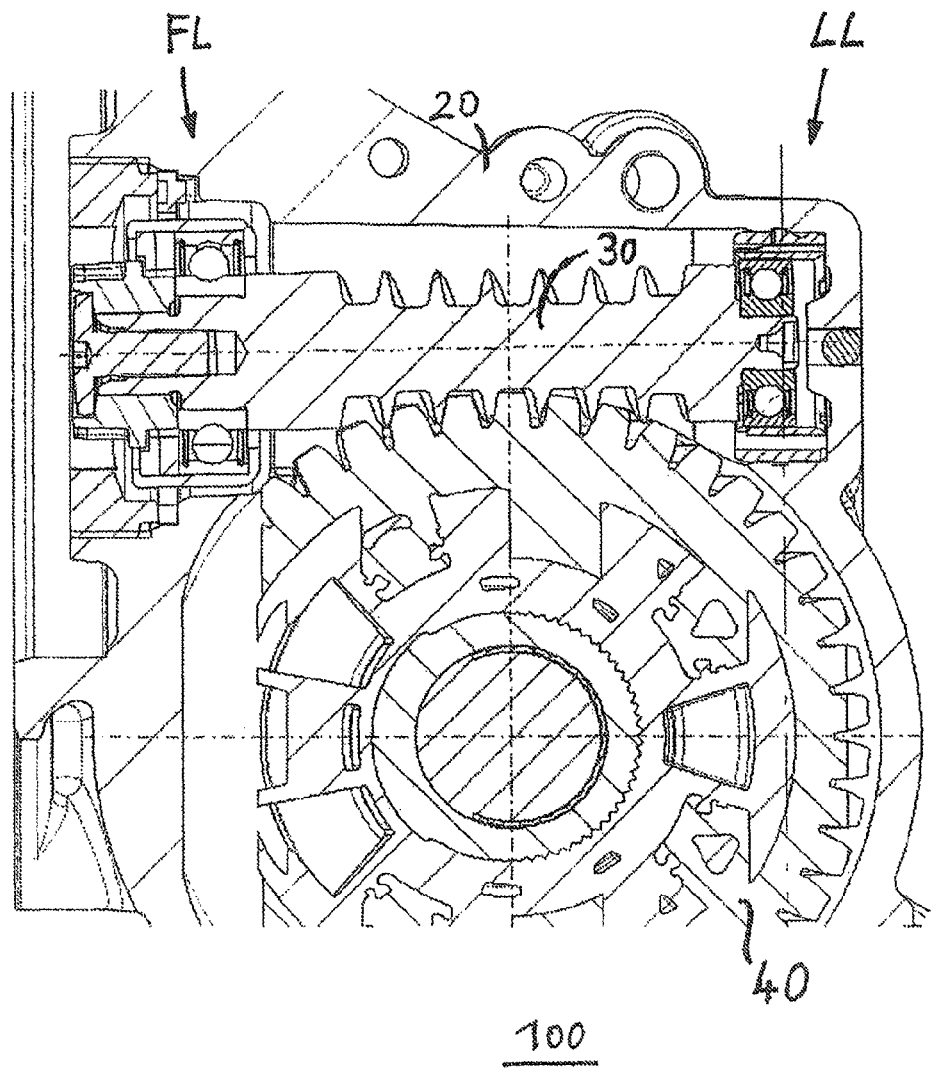
FIG. 2a is a cross-sectional view of a steering gear according to the invention (helical gear mechanism) comprising a shaft bearing configuration on the fixed bearing side and one on the floating bearing side.

In comparison with the prior art (FIG. 1), FIG. 2a shows the first exemplary embodiment of a steering gear 100 according to the invention, which characterizes the shaft bearing configurations of the drive-side shaft end, and of the free shaft end, of a worm 30 disposed in the steering gear, which are described hereafter in detail, in the housing 20, both on the fixed bearing side FL and on the floating bearing side LL, wherein the worm is engaged with a worm gear 40.

The shaft bearing configuration 50 on the fixed bearing side FL is shown in detail based on FIG. 2b and is described hereafter with reference to FIGS. 3 to 13 (the bearing configurations implemented on the floating bearing side are described below based on FIGS. 14 to 20).

Figure 2B:
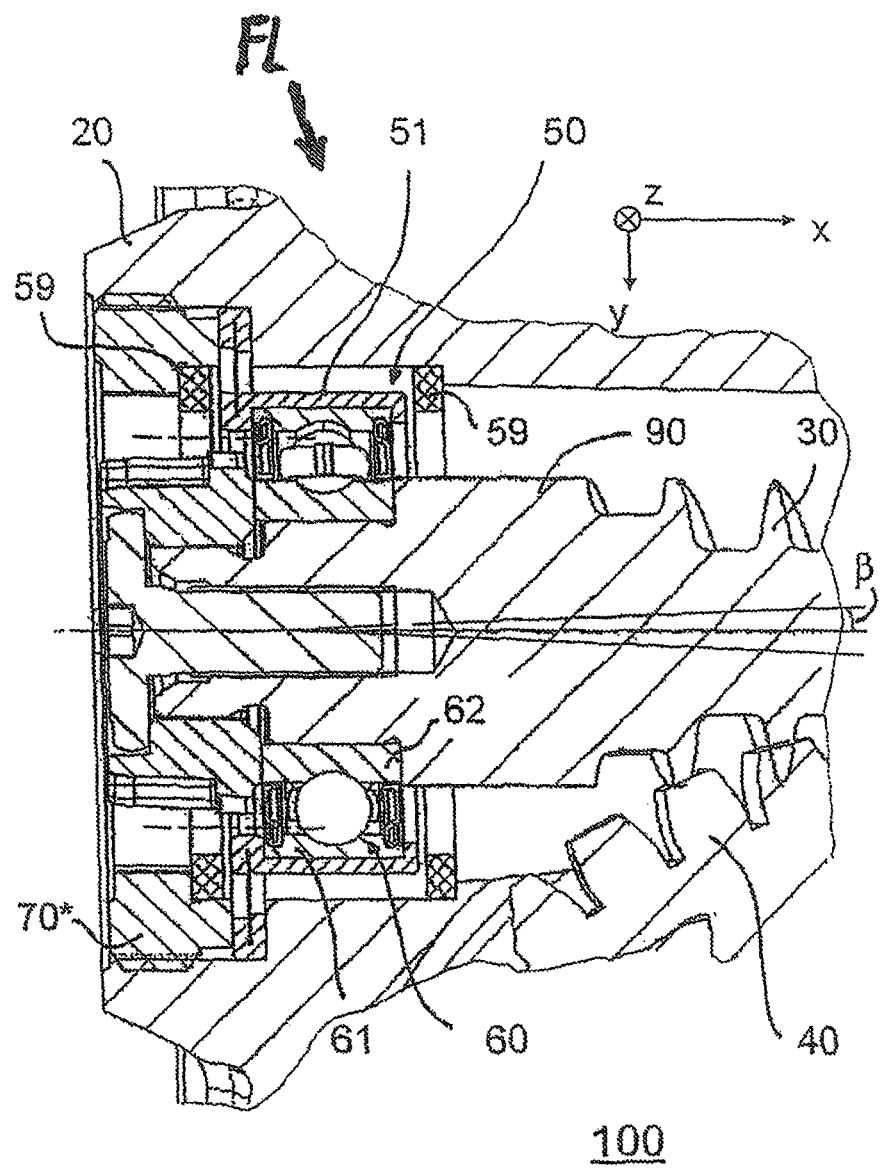
FIG. 2b is a cross-sectional detailed view of a first embodiment of a helical gear mechanism comprising a shaft bearing configuration according to the invention on the fixed bearing side.

FIG. 2b shows the cut-out of the fixed bearing side FL of a steering gear 100 designed as a worm gear mechanism. A worm 30, which can be connected to an electric driving motor (not shown) via a shaft 90, is disposed in a housing section 20, which is to say the gearbox housing, and engages there with the worm gear 40. So as to improve the engagement, a floating bearing (not shown here, but described hereafter) is provided, which elastically mounts the free end of the worm 30 and applies a preload force thereto so as to push the worm radially (in the y direction) against the worm gear 40.

The shaft 90 of the worm 30 is mounted on the fixed bearing side in a shaft bearing configuration 50 comprising a mounting 51 which can be received in the housing section 20 and which receives the outer ring 61 of the rolling bearing 60 (designed here as a ball bearing), wherein the mounting 51 has openings 52 which allow slight torsional flexing of the mounting 51. The shaft bearing configuration 50 is also received in the housing section 20 so as to be axially displaceable (in the x direction). The mounting 51 has an annular (here even crucible-shaped) design, whereby it securely receives the outer ring 61 of the rolling bearing or ball bearing 60, and more particularly fixes the same without play. For this purpose, the mounting 51 comprises a section having a crucible or cylindrical housing shape, which entirely encloses the outer ring 61 of the ball bearing 60. Another section of the mounting 51 has a disk shape and is used to attach the mounting 51 in the housing section 20. This is done, for example, by means of an adjustable threaded ring 70*. Preferably, elastic damping elements 59 for the axial movement (x direction) are also provided.

Figure 3A:
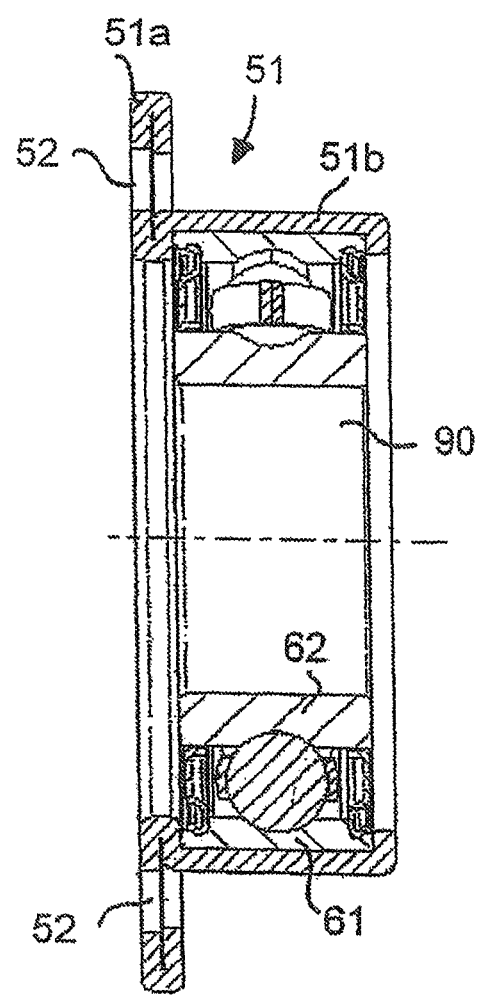
FIGS. 3a, b, c show differing views of the first embodiment of the mounting that is provided in the shaft bearing configuration (fixed bearing side)
Figure 3B:
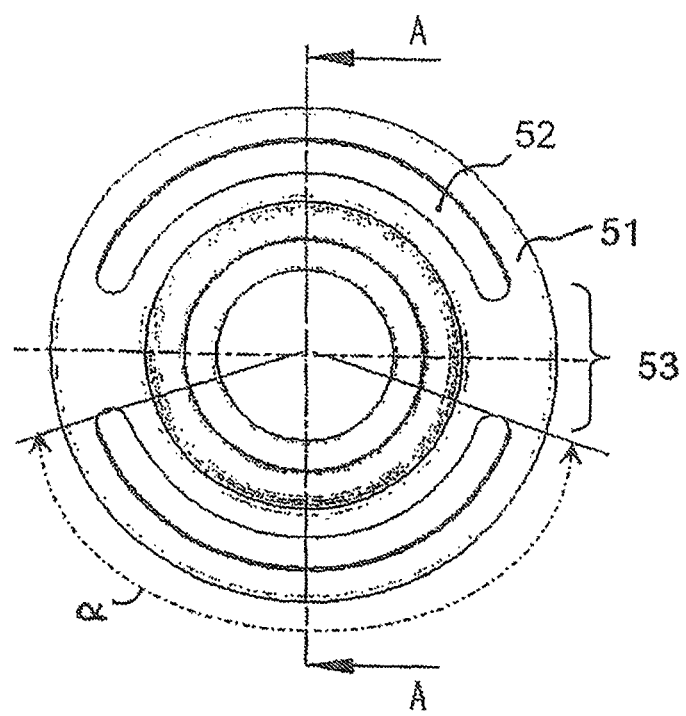
FIG. 3d shows the elastic mobility or pivotability of the mounting.
Figure 3C:
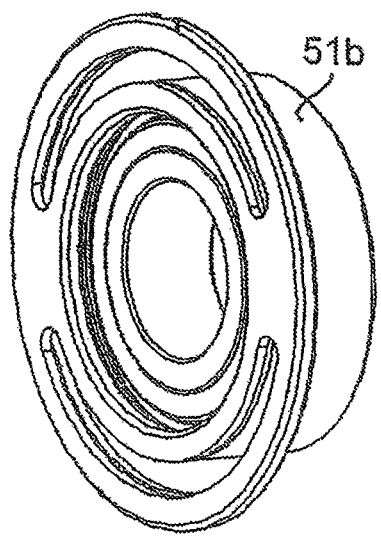

As is shown in FIGS. 3a, 3b and 3c, the mounting 51 can be produced as one piece from sheet metal, and more particularly from spring steel sheet, and can fix the outer ring 61 without play. The openings 52 allow relative movement between the disk-shaped section (spring washer) 51a and the crucible-shaped section (receiving housing) 51b. The two sections can notably torsionally flex relative to each other in a defined direction (for example in the y direction). The openings 52 are present, for example, in the form of circular segment-shaped cut-outs in the spring washer 51a, in such a way that two mutually opposing transition regions 53 or land-shaped transitions are created toward the receiving housing 51b. The openings 52 have a defined opening angle a. The attendant material reduction results in a definable elasticity in the mounting 51, allowing the receiving housing 51b to pivot slightly, relative to the spring washer 51a. The two transition regions 53 act as torque rods during pivoting and create a defined pivoting moment that acts on the worm.

Figure 3D:
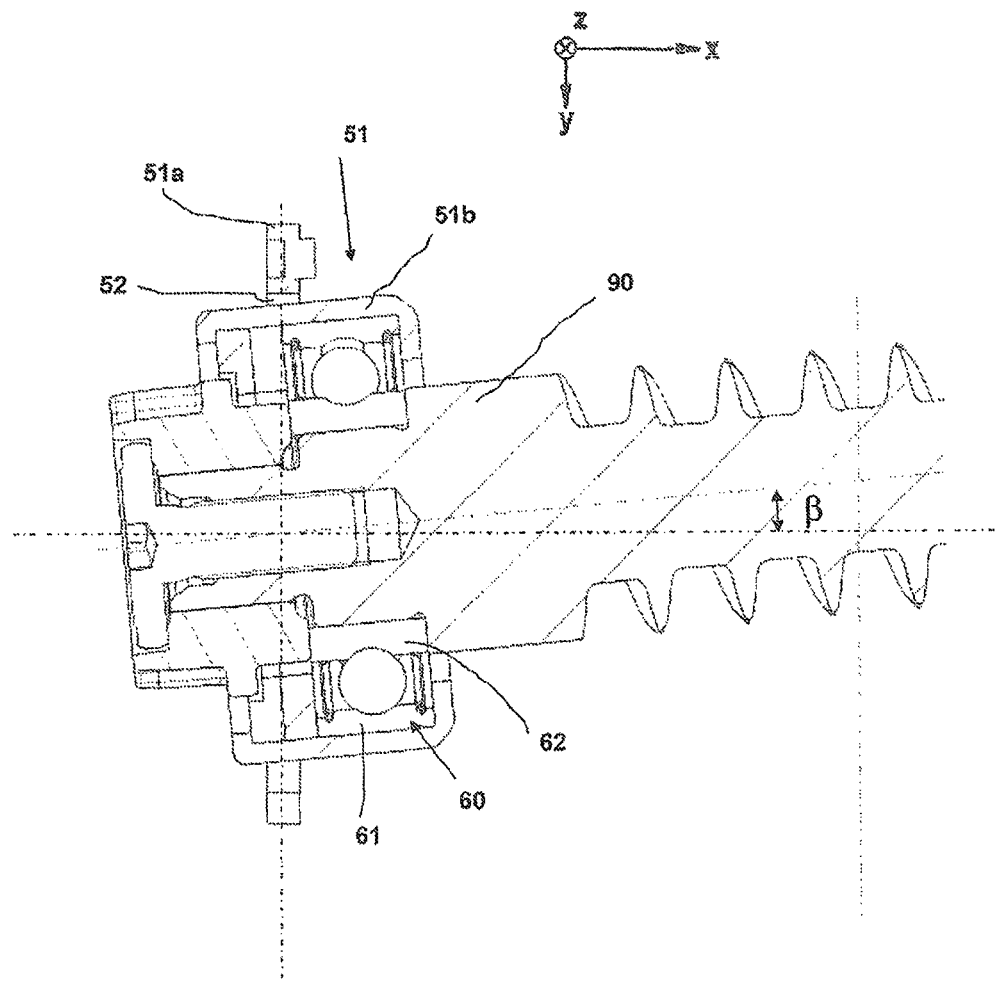

This movement option is illustrated in FIG. 3d, which shows pivoting or torsional flexing between the two sections 51a and 51b about an angle b. The two lands 53 (see FIG. 3b) form a semicardanic connection or suspension, which is oriented along the z axis. The pivoting direction is thus perpendicular to the shaft axis (x direction) and extends in the radial direction (y direction), whereby an elastically pivotable shaft bearing configuration of the ball bearing or worm shaft 90 becomes possible and the center distance of the two gear components, these being the worm and worm gear, is reduced. When the gear components are assembled, the worm must pivot in the transition region 53, because otherwise no assembly would be possible due to the reduced center distance. The torsion of the transition regions 53 results in the spring loading of the worm into the worm gear. The interlocking is thus without play and the noise that develops during changes in steering is acceptable.

The rolling bearing or ball bearing 60 (see also FIG. 2b) is designed, for example, as a four-point bearing and is fixed by the mounting 50, which preferably can also be moved axially in the x direction. Elastic damping elements 59, against which the axially movable mounting 50 strikes, are provided as stop elements on the housing section 20. The mounting 51 itself is fixed via the spring washer 51a, which is secured in the housing section 20 by means of a threaded ring 70*.

Figure 4A:
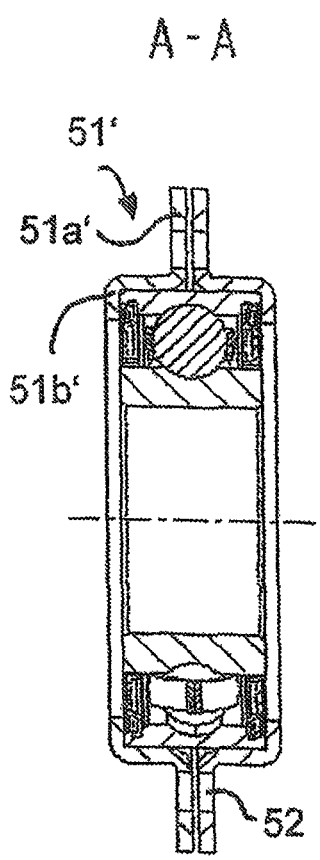
FIGS. 4 a, b, c show differing views of a second embodiment of a mounting that is provided in the shaft bearing configuration.
Figure 4B:
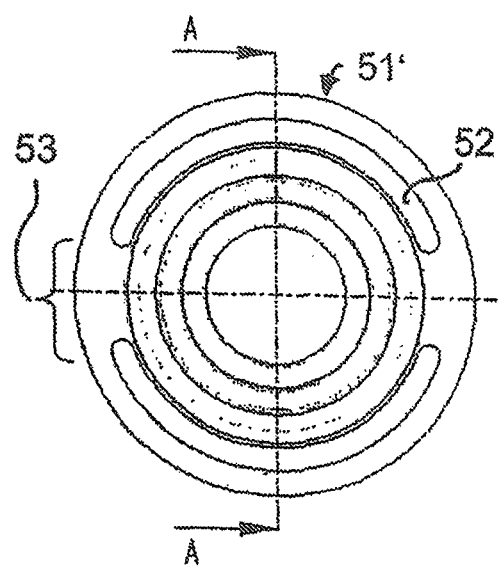
Figure 4C:
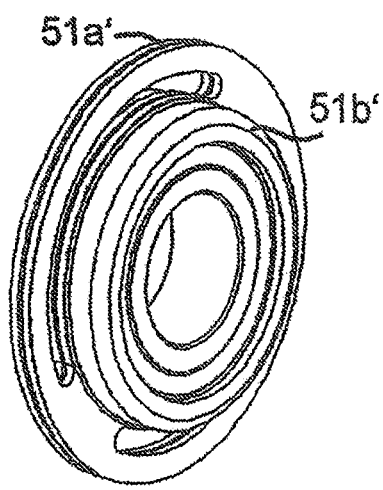

As is shown in FIGS. 4a, 4b and 4c, an embodiment may also be such that the mounting 51' has a multi-piece design. The mounting 51' is, for example, composed of two shell-shaped metal sheets 51a', 51b', which can notably be designed to be symmetrical to each other. The shaft bearing configuration can also, for example, be implemented by a mounting which is formed directly on the outer ring 61 of the ball bearing 60 (see FIG. 3d).

Figure 5A:
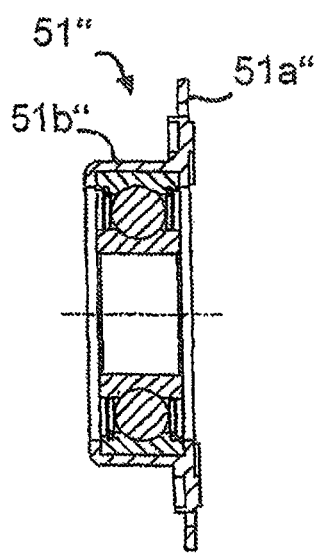
FIGS. 5 a, b show differing views of a third embodiment of a mounting that is provided in the shaft bearing configuration.
Figure 5B:
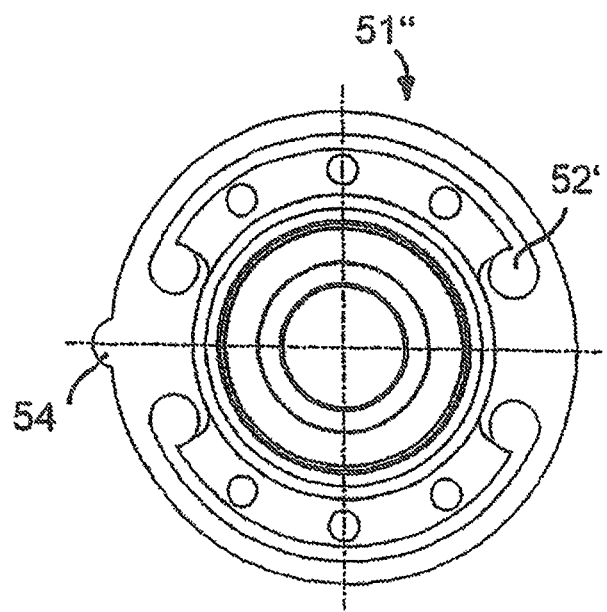

FIGS. 5a and 5b show a further embodiment in which the mounting 51" likewise has a multi-piece design, wherein the two sections 51a" and 51b" are clinched to each other. The disk-shaped section 51a" (spring washer) is produced from spring steel sheet and the crucible-shaped section 51b" is produced from deformable soft sheet metal. An outer bead 54, or tenon, or nose, is provided on the spring washer 51a" so as to be able to exactly position the spring washer, and thus the entire mounting 51", in the housing section. This construction also corresponds to an elastic semicardanic connection, which allows a pivotable movement of the crucible-shaped section 51b" relative to the spring washer 51a".

Figure 6:
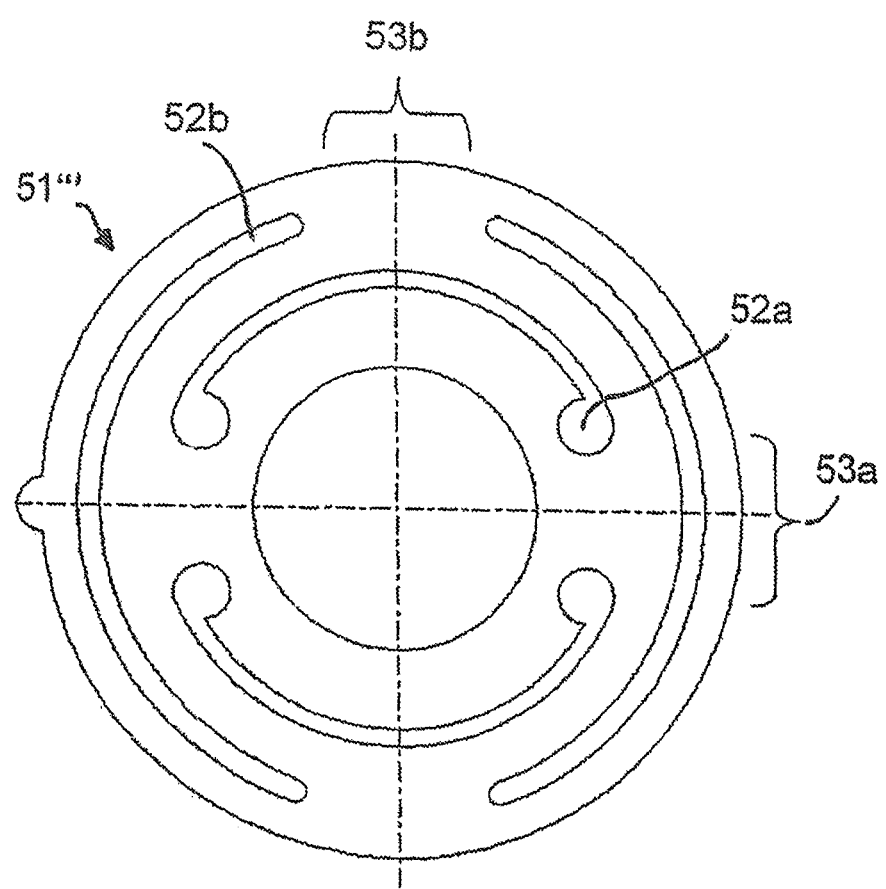
FIG. 6 shows a fourth embodiment of a mounting that is provided in the shaft bearing configuration (fully cardanic variant)

FIG. 6 shows another variant in the form of a mounting 51'''. Here, an elastically fully cardanic connection is made possible between the two sections. For this purpose, the spring washer contains four openings, two openings 52a of which are located in the inner region of the spring washer and, shifted 90 degrees therefrom, are two further openings 52b in the outer region of the spring washer. Thus, two mutually opposing land-shaped transition regions 53a and 53b are obtained in each case, which each constitute a semicardanic suspension (see FIG. 3d), whereby a fully cardanic suspension is attained. The design shown here allows a pivoting movement in all directions from the center of the spring washer. In other words: the pivot axis can be located arbitrarily in the plane of the spring washer (y-z plane), and extend through the center of the spring washer. This creates full mobility or elasticity of the shaft bearing configuration.

Figure 7A:
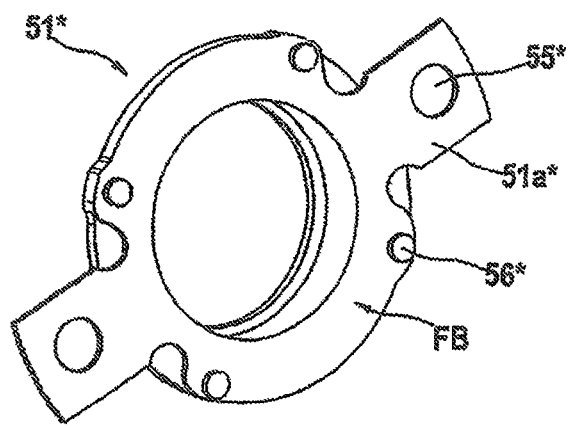
FIGS. 7 a, b show a fifth embodiment of a mounting that is provided in the shaft bearing configuration (two-part semi-cardanic variant)
Figure 7B:
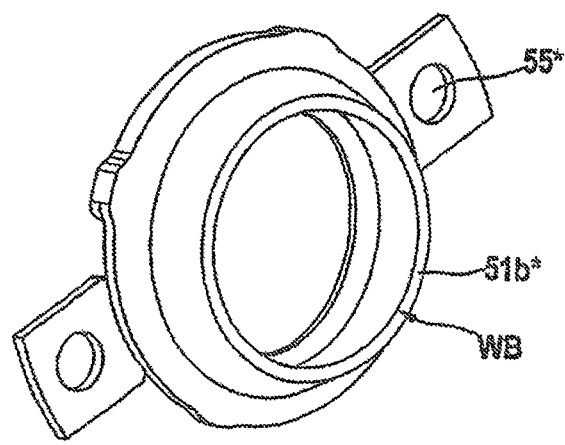
Figure 8A:
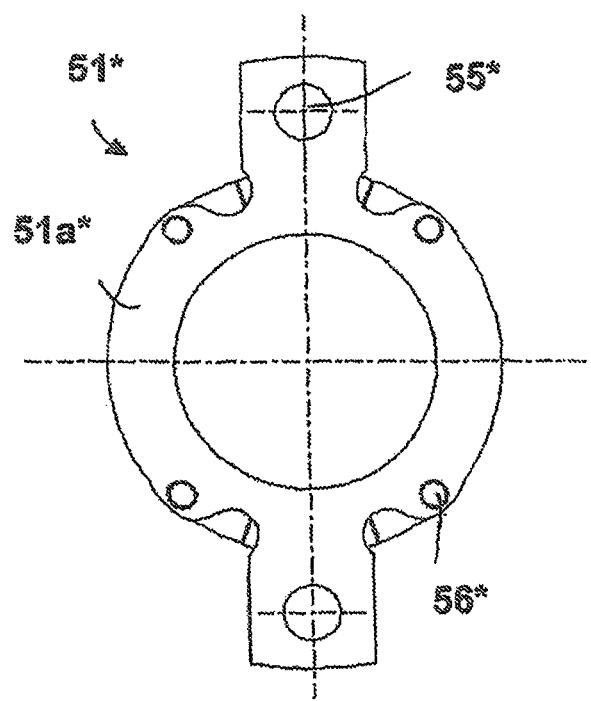
FIGS. 8 a, b, c show cross-sectional views of FIGS. 7a, b.
Figure 8B:
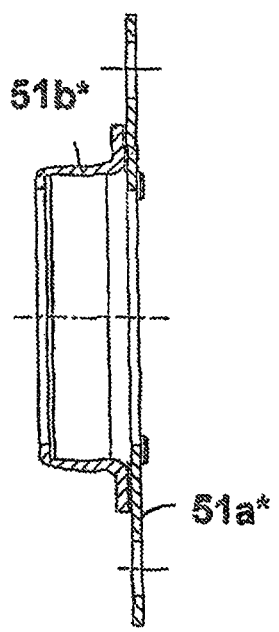
Figure 8C:
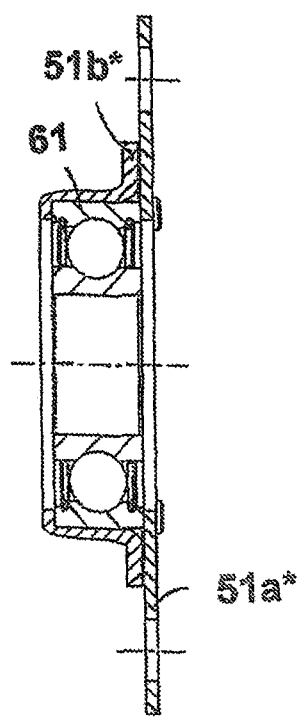
Figure 9A:
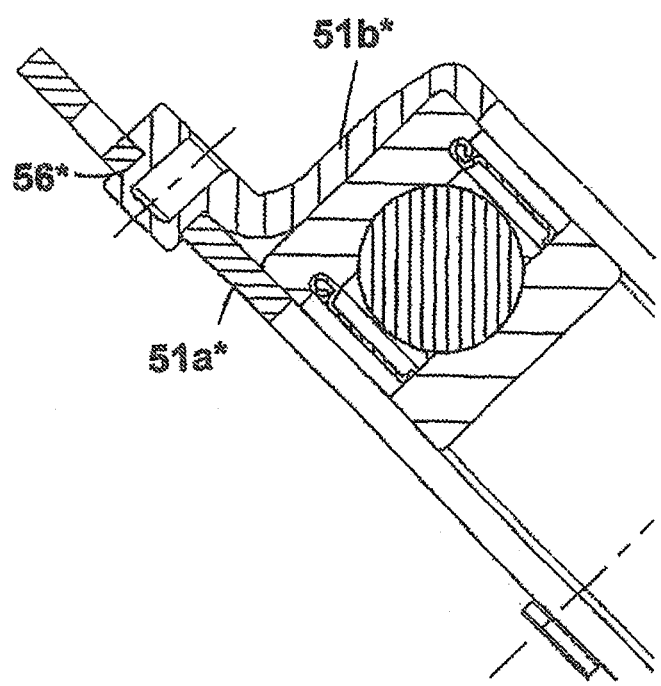
FIGS. 9 a, b show details of a connecting technique for producing the two-part mounting of FIGS. 7a; b.
Figure 9B:
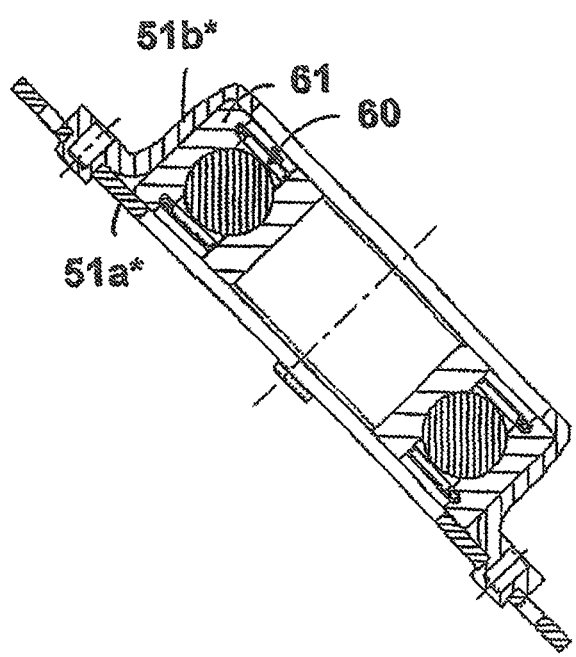

As a fifth embodiment, FIGS. 7a and 7b show a two-part mounting 51*, which in addition to a crucible-shaped section or section part 51b* contains a non-disk-shaped but lug-shaped section or section part 51a*. This saves material. Moreover, the mounting can be attached or assembled in the housing by way of through bores 55*, which are provided in the lug-shaped section 51a*. FIGS. 8a to 8c show related cross-sectional views.

The lug-shaped section 51a* is produced from a first sheet metal or sheet metal material, which is to say spring steel sheet. The crucible-shaped section 51b* is produced from a second sheet metal which is softer than the first sheet metal. In order to connect the two parts 51a* and 51b*, the first section part 51a* contains several apertures 56* or holes through which material of the crucible-shaped part 51b*, which is made of soft sheet metal WB, is pushed on one side and then compressed on the opposite side, for example to form rivets, as is illustrated with FIGS. 9a, b.

So as to produce the mountings described here, as they are represented by the mounting 51*, for example, according to the invention, apertures 56* are provided in the first sheet metal, with material of the second sheet metal being pushed through the apertures from the one side and then being formed from the opposite side, whereby a positive fit and/or non-positive fit connects the two section parts 51a*, 51b* to each other.

Figure 10A:
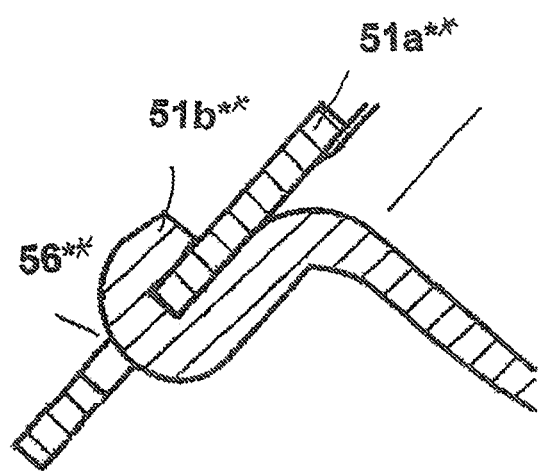
FIGS. 10 a, b show details of an alternative connecting technique and a sixth embodiment of a mounting produced therewith.
Figure 10B:
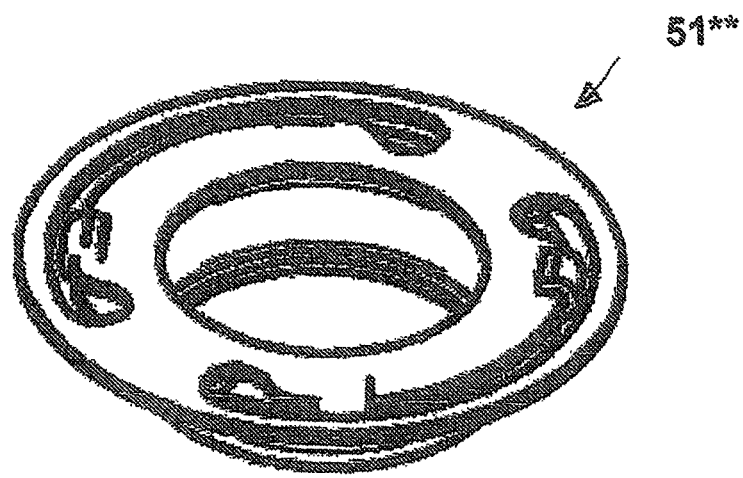

FIGS. 10a, b show details of an alternative connecting technique and a sixth embodiment of a mounting 51** produced therewith, the mounting again comprising a disk-shaped section.

So as to produce this mounting 51, according to the invention, apertures 56 are likewise provided in the first sheet metal, however protruding regions of the crucible-shaped section part 51b* are then placed through these apertures so as to then be formed on the opposite side, whereby a positive fit and/or non-positive fit likewise connects the two section parts 51a, 51b to each other, wherein, for example, a closed rivet head or an open rivet head or tubular rivet is formed.

When producing such mountings, and more particularly when connecting the two section parts or halves, it is also possible for the two parts to be connected by means of press joining or clinching, or by means of punch riveting.

Moreover, it is possible to connect the two section parts using additional rivets and/or additional screws.

The designs and production steps described here achieve at least a semicardanic connection in the mounting for the ball bearing and worm shaft so as to make the engagement of the worm and worm gear elastically pivotable. This reliably prevents not only rattling and vibration noise, but also distortion or jamming of the worm gear mechanism due to excessive expansion of certain materials. Thus, elastic toothing engagement of the worm gear mechanism is achieved in an advantageous manner.

Figure 11A:
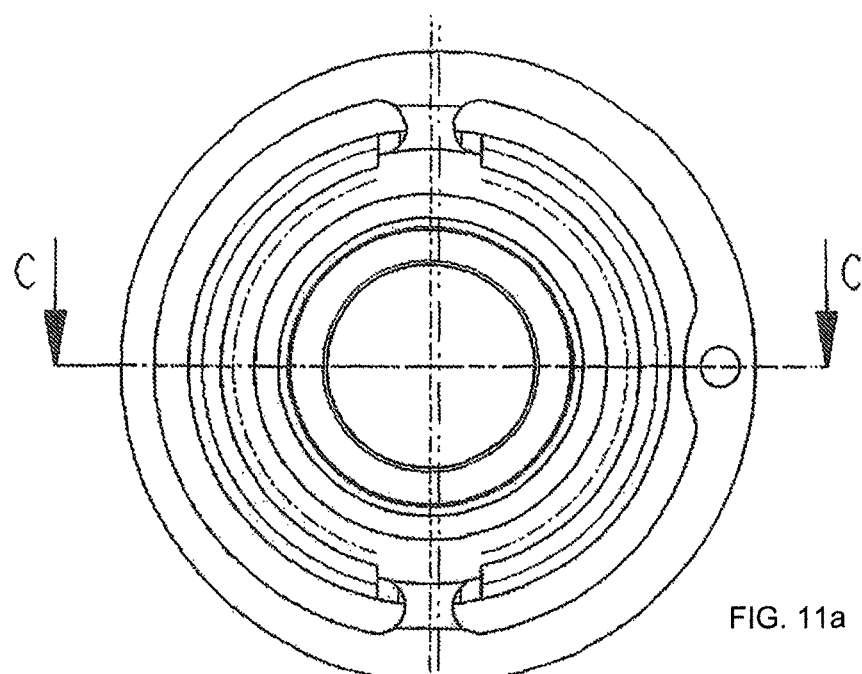
FIGS. 11 a, b show differing views of a sixth embodiment of a mounting that is provided in the shaft bearing configuration (fixed bearing side)
Figure 11B:
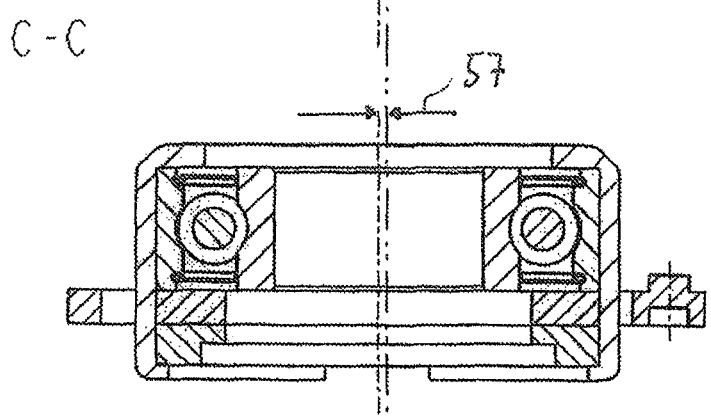
Figure 12:
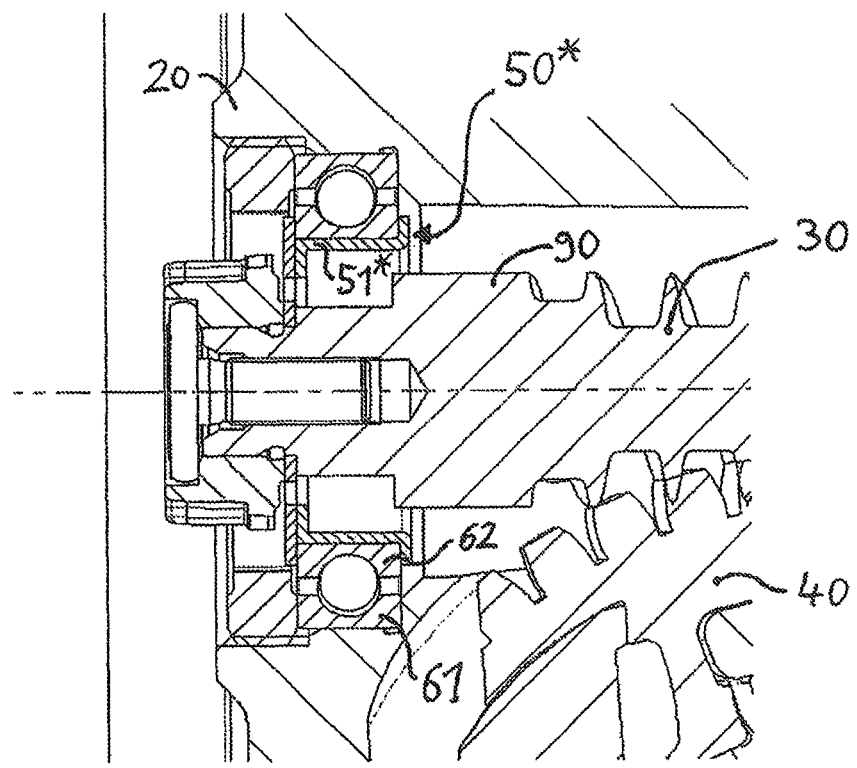
FIG. 12 is a cross-sectional detailed view of a seventh embodiment of a helical gear mechanism comprising an alternative shaft bearing configuration on the fixed bearing side.
Figure 13:
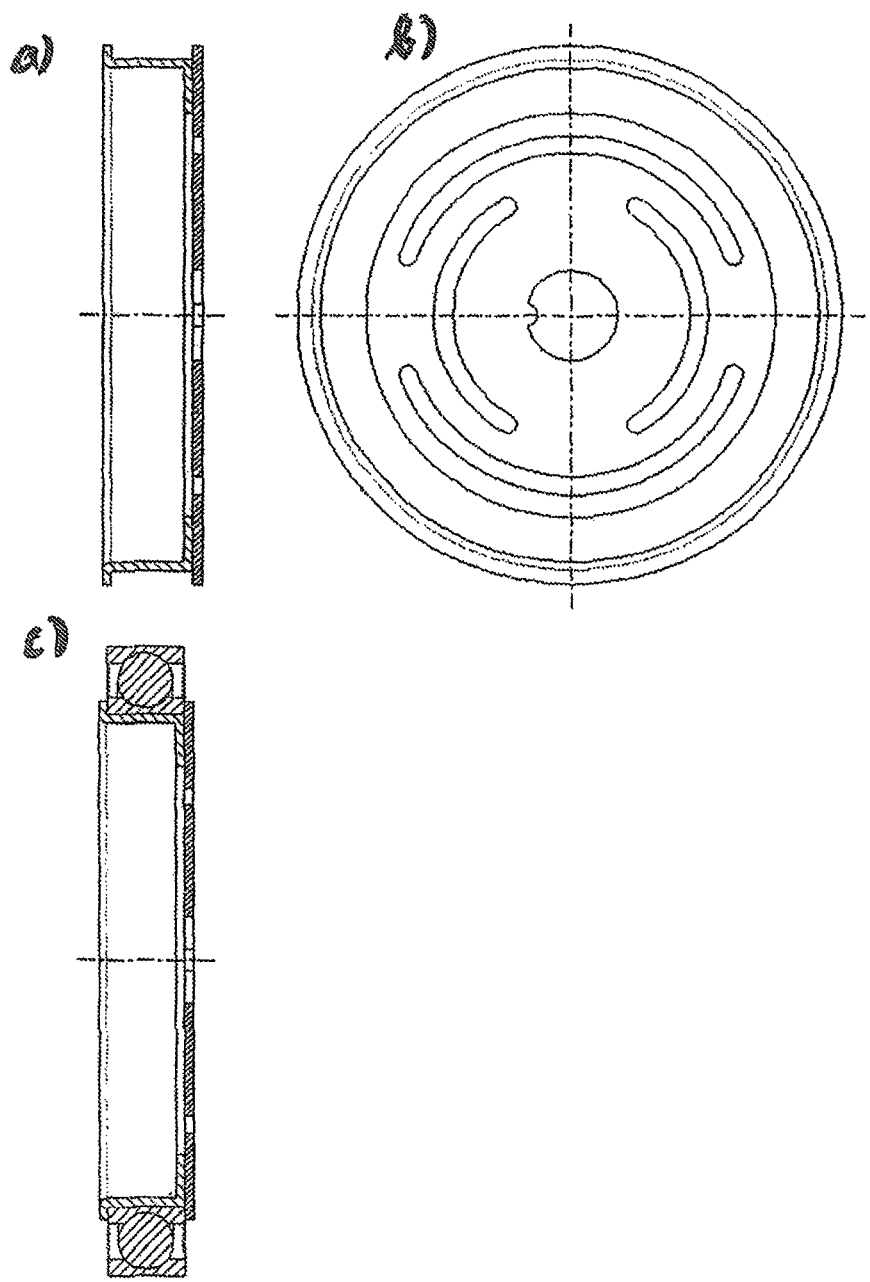
FIGS. 13 a, b, c show differing views of the seventh embodiment of the mounting that is provided in the shaft bearing configuration (fixed bearing side)

FIGS. 11a and 11b show differing views of another embodiment of the mounting according to the invention, wherein the annular or crucible-shaped section again receives the outer ring of the rolling bearing. The reduced center distance of the gear mechanism parts is achieved by the offset 57. The spring washer 51a and the rolling bearing have differing or mutually offset centers. The offset 57 can also be achieved when the bearing points of the two gear mechanism parts in the housing have this offset.

As an alternative design to the aforementioned embodiments, FIG. 12 and FIGS. 13a to 13c show a steering gear 100* comprising a mounting 50* according to the invention installed on the fixed bearing side, in which the annular section 51* carries the inner ring 62 of the rolling bearing and the outer ring 61 is installed directly in the housing section 20. The disk-shaped section of the mounting 51* is now connected (braced) to the shaft 90, creating the elastic pivotability between the inner ring 62 and the shaft 90. By comparison, the design in the aforementioned examples (FIGS. 2 to 11) is such that the elastic pivotability is created between the outer ring and the shaft. Both variants (FIGS. 2a/b to 13, and FIGS. 12 and 13a to 13c) share the common principle that the annular section of the mounting carries the rolling bearing on the outer or inner ring, and the disk-shaped section assures elastic retention of the rolling bearing in the housing or on the shaft by means of the openings provided there. A flexible fixed bearing is thus created, which is cost-effective to produce and can be adjusted to the specific requirements.

Hereafter, a bearing device is described in various embodiments for the floating bearing side (see also LL in FIG. 2a), which can be implemented in a steering gear, by way of addition or alone, and assures reduced noise and spring-loading of the toothing engagement notably at the free shaft end of the worm.

The bearing device described hereafter with reference to FIGS. 14 to 20 is based on a rolling bearing or ball bearing, which in turn is received in a bearing inner ring or inner bushing (see 70 in FIG. 14), wherein the bearing inner ring is connected by means of a land (see 71 in FIG. 14) to a bearing outer ring or outer bushing (see 72 in FIG. 14) disposed in the housing. The bearing device also comprises elastic stop elements (see 74, 75 in FIG. 14), which absorb the movements of the rolling bearing and thus reduce the noise that occurs during steering movements with load changes. The annoying noise is created during the tooth flank changes between the worm and the engaging worm gear when the play between the worm and the worm gear is too large. The pivotable elastic land and the stop elements, or spring element, pushing on the bearing reduce the noise.

Until now, such spring elements or spring dampers had to be screwed into the housing during the assembly process and manually adjusted by the assembly staff. Notably a threaded bore had to be provided in the housing of the steering gear to adjust a conventional spring damper. All this necessitated relatively high manufacturing and assembly complexity on the floating bearing side.

So as to reduce the manufacturing and assembly complexity, according to the invention at least one elastic stop element or spring element is disposed between the bushings (inner ring and outer ring). As an alternative, the spring element may also be disposed between the housing and inner ring, or between the housing and a bearing outer ring, or between the outer ring and the inner ring, or between the outer ring and the bearing outer ring. Thus, only a few components are now required, at times only a single component, this being the elastic stop element, so as to reduce the noise between the worm and the worm gear. The threaded bore required until now can likewise be eliminated, which considerably reduces the manufacturing and assembly complexity.

Figure 14:
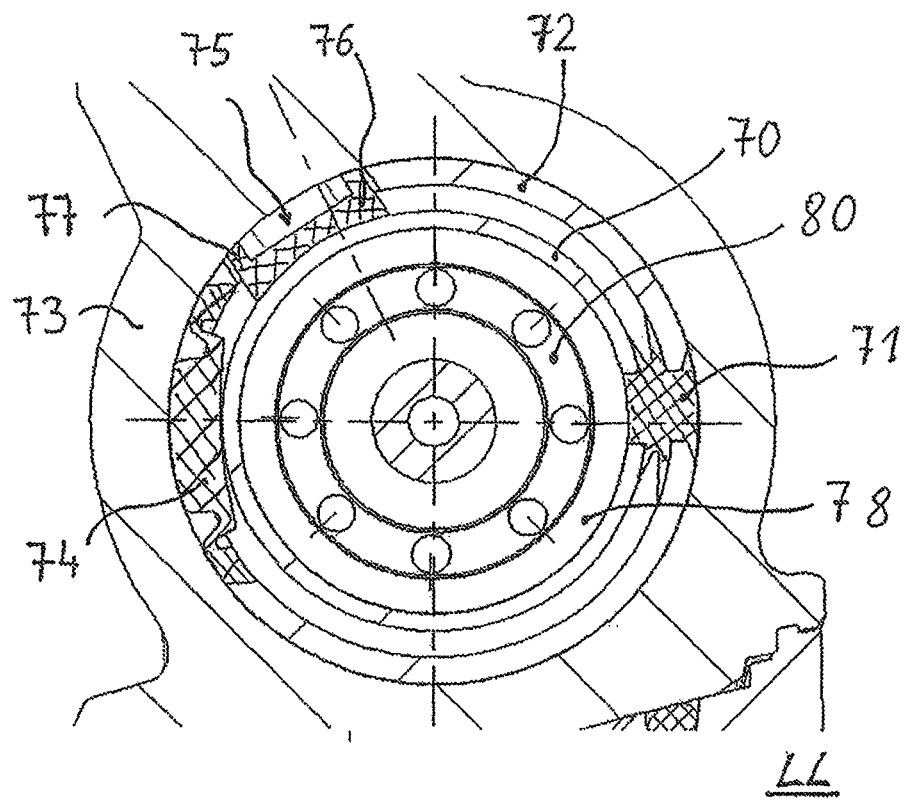
FIG. 14 is a radial cross-sectional detailed view of a first embodiment of a shaft bearing configuration formed on the floating bearing side.

FIG. 14 shows a radial cross-section of the composition of such a floating bearing LL, in which a rolling bearing 80 (here, a ball bearing) is provided, the outer ring 78 of which is received in an inner bushing 70 (bearing inner ring). The inner bushing 70 is connected to an outer bushing 72 (bearing outer ring) by means of a land 71 (elastic pivot land), with the outer bushing 72 disposed in the steering gear housing 73. Because of this arrangement, and more particularly because of the elastic land 71, the floating bearing LL can swing up and down in accordance with the back and forth movement of the worm (see FIG. 2a). The land 71 is preferably produced from elastomer so as to be able to reliably carry out the swinging movement over a very long time. A stop element 74, which is preferably likewise produced from elastomer, is provided opposite the land 71. This stop element 74 has a resilient effect and notably prevents torsional flexing of the worm relative to the worm gear.

Figure 15:
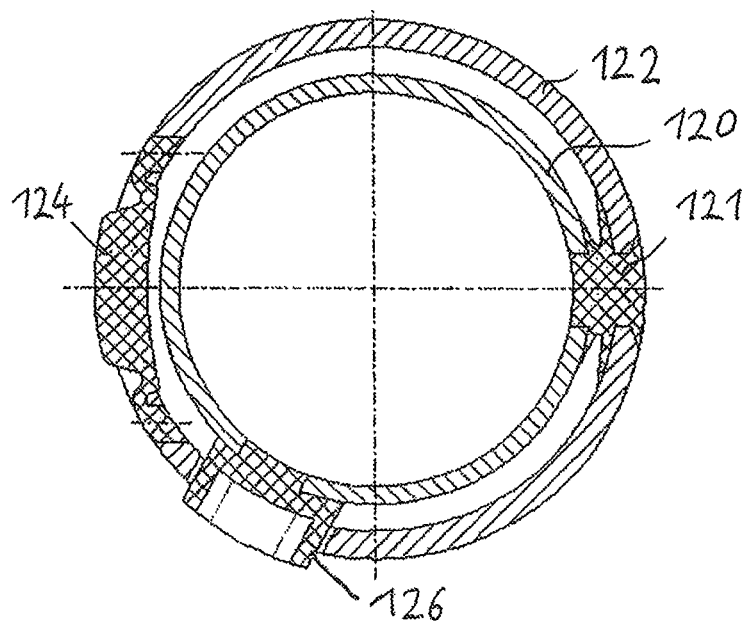
FIG. 15 is a radial cross-sectional detailed view of a second embodiment of a shaft bearing configuration formed on the floating bearing side.

A further stop element is disposed radially offset therefrom (here, above the stop element 74) and serves as a limit stop 75 and can also be implemented by a spring element, for example, which acts on the inner bushing 70 at least during a load change and thus has a damping effect on the floating bearing LL. FIG. 14 shows the situation after installation or assembly of the floating bearing; FIG. 15 shows the situation before. As is apparent from a comparison of the two figures, during assembly the stop element 74 is pushed against the inner bushing 70, resting against the same. The limit stop element can also push against the inner bushing, as is shown, for example, based on the element 135 in FIG. 16.

The worm is pushed against the worm gear by the pressure of the respective stop element or spring element on the inner bushing, and thus on the rolling bearing itself, whereby tooth flank play (yielding of the worm or worm gear) and undesirable noise, notably during load or tooth flank changes, are reduced.

The element 75 (see FIG. 14) can comprise a bottom region 76 having a greater thickness and an edge region 77 having a lower thickness. The edge region 77 having the lower thickness gives the element 75 a lower spring rate, while the bottom region having the greater thickness gives the element 75 a higher spring rate. The element 75 can thus have two different spring rates, which have an effect depending on the respective compression of the element 75.

Because of the up and down swinging movement of the worm, the element 75 pushes on the bearing 80 to varying degrees. Under less compression, the effect of the edge region 77 having the lower spring rate develops, whereby the play between the worm and worm gear is reduced. Under stronger compression of the element 75, the effect of primarily the bottom region 76 having the higher spring rate develops, whereby undesirable noise during the tooth flank changes is reduced.

Figure 16:
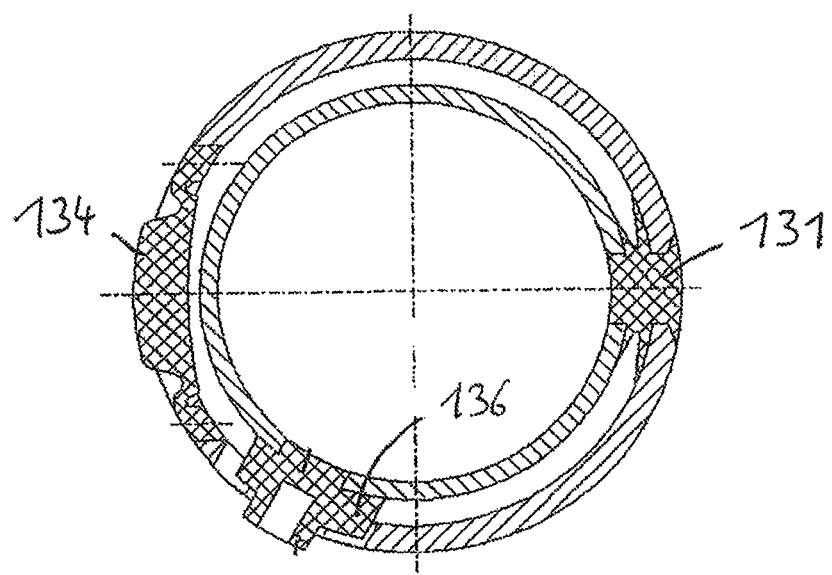
FIG. 16 is a radial cross-sectional detailed view of a third embodiment of a shaft bearing configuration formed on the floating bearing side.
Figure 17:
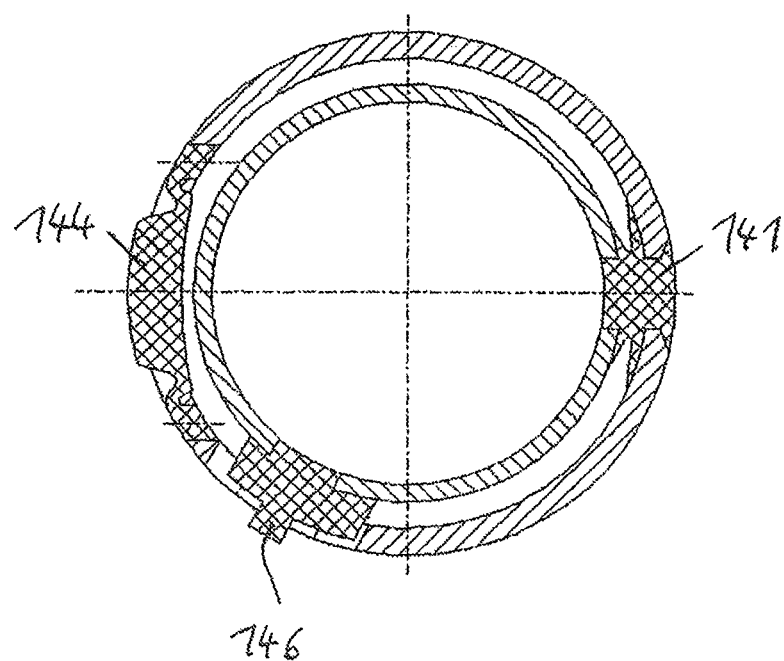
FIG. 17 is a radial cross-sectional detailed view of a fourth embodiment of a shaft bearing configuration formed on the floating bearing side.
Figure 18:
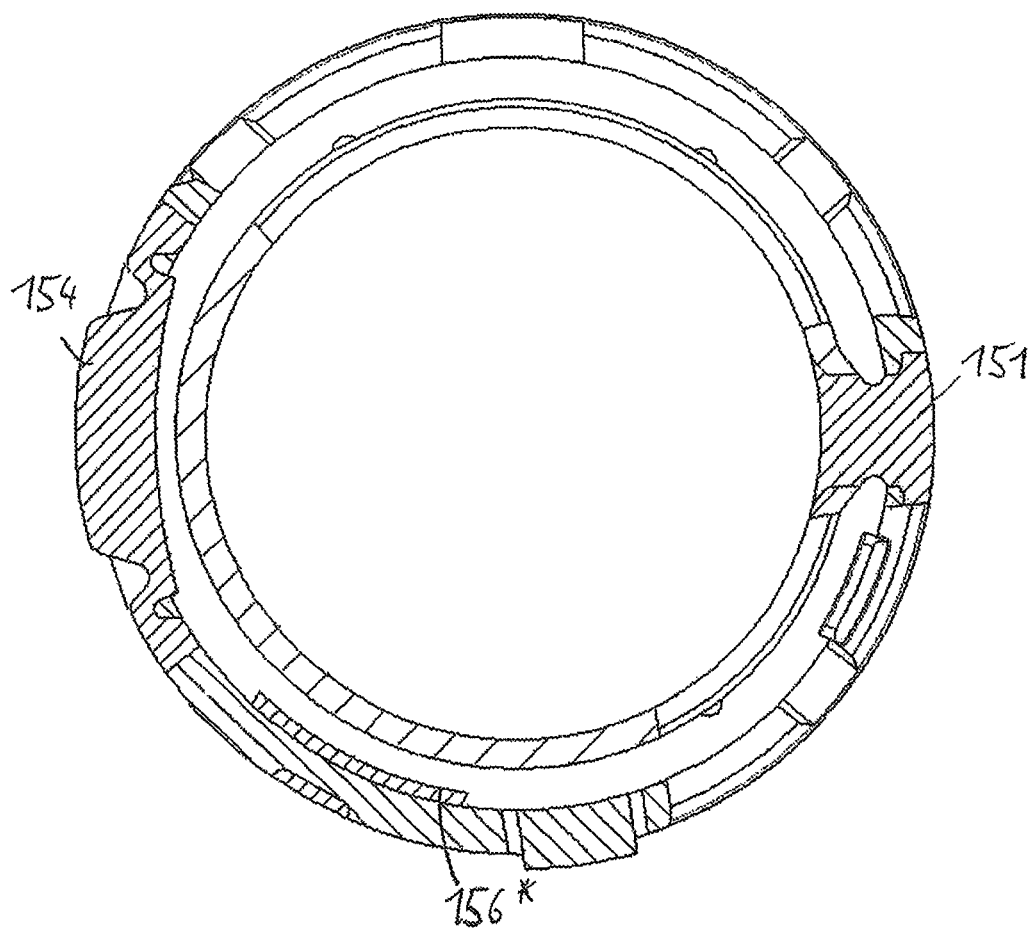
FIG. 18 is a radial cross-sectional detailed view of a fifth embodiment of a shaft bearing configuration formed on the floating bearing side.

FIGS. 16 and 17 show further variants of elastic stop elements or spring elements. Here, the respective limit stop 136 or 146 may also comprise a thicker bottom region and a thinner edge region, wherein the transition region between the bottom region and the edge region may be surrounded by a bead. Such a special geometric shape gives the stop or spring element a typical spring characteristic, which likewise has two different spring rates. The special shape of the stop or spring elements creates special spring characteristics so as to reduce the play between the worm and the worm gear.

Figure 19:
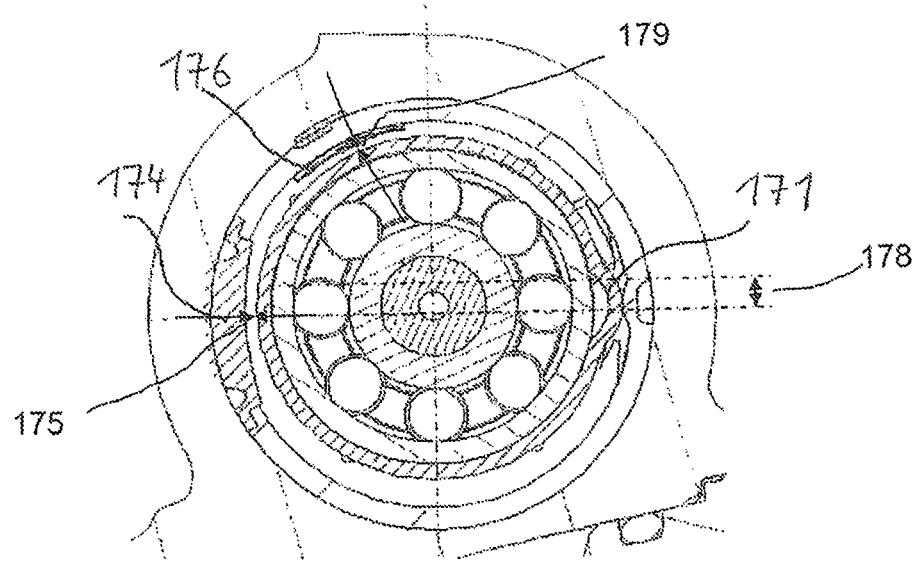
FIG. 19 shows various cross-sectional detailed views of a sixth embodiment of a shaft bearing configuration formed on the floating bearing side.
Figure 20:
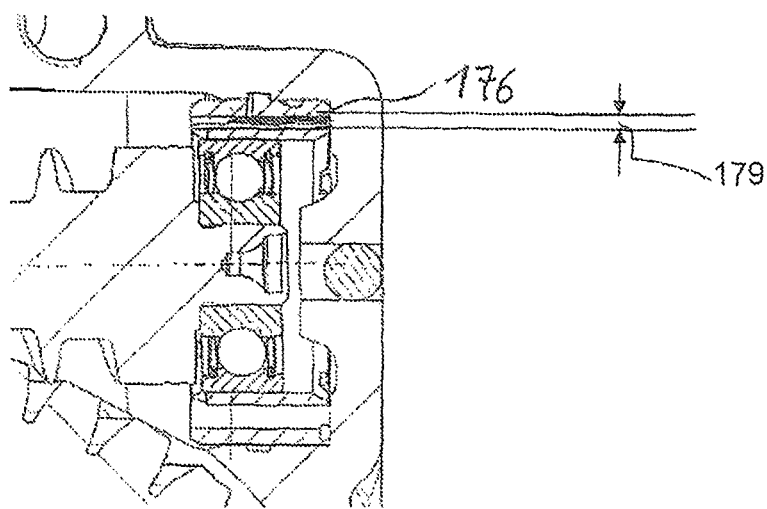
FIG. 20 is an axial cross-sectional detailed view of the sixth embodiment of a shaft bearing configuration formed on the floating bearing side.
Figure 21:
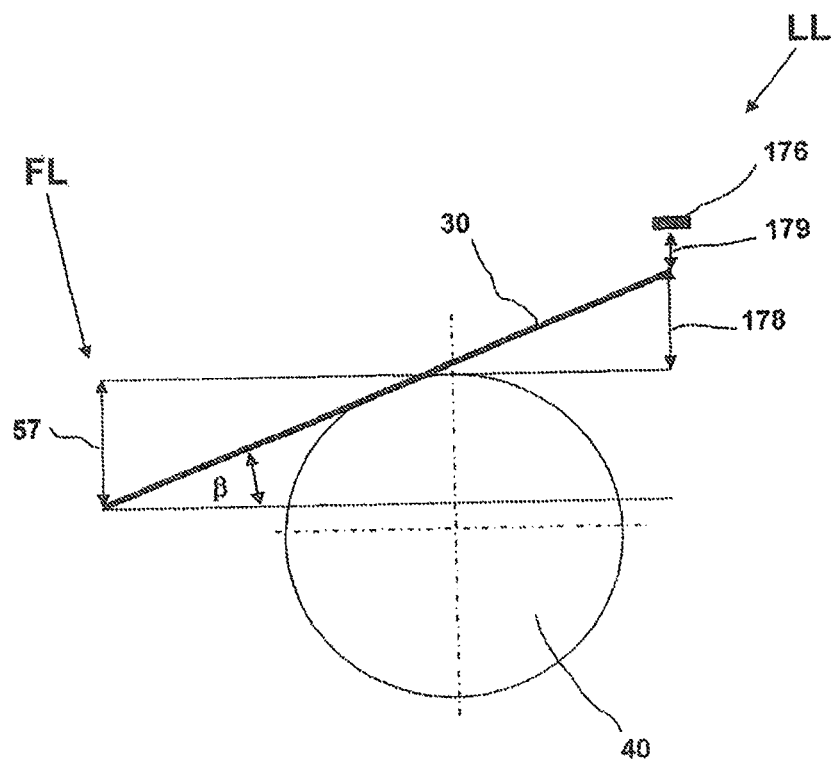
FIG. 21 is a schematic functional representation illustrating the spring loading of the worm caused by the invention.

The stop or spring elements, such as elements 174 and 176 in FIGS. 19 and 20, for example, can be produced from an elastomer. The respective spring element produced by means of the elastomer is initially strongly compressed after installation. However, elastomeric materials tend to creep under high compression or tension, thus reducing the reaction force applied by the elastomer. During the creep process, the spring force generated by the spring element consequently decreases soon after the element is installed, whereby the friction between a worm and worm gear is likewise reduced in a desirable manner. The use of the elastomeric material also eliminates the previously required adjustment of the spring element, because the optimal pressure forces of the spring element self-adjust due to creeping. Consequently, even the threaded bore in the housing of the steering gear and a spring damper for adjusting the play between the worm and worm gear can be eliminated in the future.

In a further embodiment, the spring element may also be produced from metal. As differs from elastomers, which have progressive spring characteristics, metallic materials have linear spring characteristics, and thus have lower gradients than the elastomeric materials during operation, and thus may be preferable, depending on the respective circumstances.

Materials having differing spring characteristics can be combined with each other to produce the spring element. In principle, it is also possible for the spring element to comprise an elastomeric material and a metallic material so as to implement the aforementioned differing spring rates. Of course it is also possible to combine elastomeric materials exclusively with each other.

In addition to the combination of differing materials to produce the spring element, different design embodiments of the spring element may be provided alternatively or additionally so as to give the spring element differing spring characteristics. For example, the spring element can comprise a bottom region having a greater thickness and an adjoining edge region having a lower thickness. In a further embodiment, it is possible for the spring element to comprise a bottom region having a greater thickness and an adjoining head region having a lower thickness.

The outer bushing (see element 70, for example, in FIG. 14) may comprise a bore in which the spring element can be placed. The spring element thus has a secure seat. The inner bushing may likewise comprise a bore for the same reason.

The spring element may be supported on the inner ring, likewise for reasons of a secure seat for the spring element. Because of the compression against the inner ring, the spring element pushes the worm against the worm gear.

The elastomer can be an elastomer that can be thermoplastically processed or that can be cross-linked. The thermoplastically processable elastomer can be injection molded and is inexpensive, while the cross-linkable elastomer has a lower tendency to creep. A thermoplastically processable elastomer can, of course, also be combined with a cross-linkable elastomer.

The respective stop element or spring element can be produced as a two-component injection-molded part, whereby the assembly and manufacturing complexity are considerably reduced. In principle, however, it is also possible to produce the inner and outer bushings from a metal sheet and to vulcanize the spring element onto the metal sheet. In addition to the spring element, a stop element and the land may be produced from elastomer. These can likewise be produced together with the spring element, the inner ring and the outer ring as a two-component injection-molded part. However, both the stop element and the land can also be vulcanized onto the inner bushing and/or outer bushing when these are produced from metal sheet.

FIG. 21 shows the entire gear mechanism in a schematic functional view and in comparison with the real view of FIG. 2a. The fixed bearing side FL is offset in the direction of the worm gear 40 by the amount of the offset 57. The dimensions are drastically enlarged for illustration purposes. When the worm gear 40 is assembled with the worm 30, the worm pivots in the transition region 53 of the mounting (see FIG. 3b, for example) and this region is twisted. Because of this torsion, the worm 30 is pushed into the worm gear 40 and thus eliminates the gear mechanism play. This spring loading or the offset is selected such that the idle breakway torque of the gear mechanism does not become too great, yet is present over the entire temperature range, and such that spring loading exists even when wear is present. Because of the offset 57, the worm is tilted by the angle b (tilt angle or pivot angle). This tilting causes the inner ring 70 to be pivoted together with the rolling bearing 80 at the floating bearing point. This pivoting 178 is shown in particular in FIG. 19 and in the schematic illustration of FIG. 21. The inner ring is able to carry out this movement because it is movably attached to the pivot hinge 171. When the gear mechanism transmits torque, the worm 30 pivots even further away from the worm gear 40 because of the tooth separating forces. This pivoting movement is limited by the stop 176 on the floating bearing bushing. The gap 179 between the inner ring and stop 176 is to be selected such that the tension in the toothing elements of the gear mechanism does not exceed the allowed limits. It is advantageous for the stop 176 to be positioned at an angle greater than 90° relative to the pivot hinge 171, so that pressure forces act primarily on the pivot hinge. The floating bearing bushing can thus be designed in a robust manner.

While the invention is described by way of the example of a helical gear mechanism designed as a worm gear mechanism, the invention is not limited to helical gear mechanisms, but rather can be applied in general to any type of steering gear. The exemplary embodiments shown are suitable, in particular, for use in an electric power steering system for motor vehicles.

The invention claimed is:

1. A steering gear of a steering system, comprising:
a helical pinion;
a helical gear;
a shaft bearing configuration adapted to be positioned at a drive-side end of a shaft of the steering system;
a bearing device at a free end of the helical pinion; and
a housing section; and wherein the helical pinion engages the helical gear and is configured to be connected to a drive of the steering system via the shaft;

wherein the shaft bearing configuration is designed as a fixed bearing and comprises a first rolling bearing for mounting the shaft;

wherein the bearing device is designed as a floating bearing and comprises a second rolling bearing for mounting the helical pinion;

wherein the shaft bearing configuration further comprises a mounting which is installed in the housing section and has openings that enable a pivoting movement by an annular section of the mounting which is assembled with the first rolling bearing;

wherein the mounting comprises a disk-shaped section which is provided with the openings and relative to which the annular section pivot;

wherein the annular section is assembled in one of either a first manner in which an outer ring of the first rolling bearing and the disk-shaped section are attached to the housing section, or in a second manner in which the annular section is assembled with an inner ring of the first rolling bearing and the disk-shaped section is attached to the shaft; and wherein the pivoting movement causes torsion of transition regions that form between the openings, wherein the torsion of the transition regions causes the helical pinion to be spring-loaded into the helical gear.

2. The steering gear according to claim 1, wherein an offset is provided on or in the mounting with the steering gear in the assembled state, the offset causing a pivoting movement of the helical pinion in relation to the helical gear, the pivoting movement being spring-loaded by the torsion.

3. A steering gear according to claim 2, wherein a center distance is created between the helical pinion and the helical gear at least by the fixed bearing, the center distance being smaller than a customary center distance by the amount of the offset.

4. The steering gear according to claim 1, wherein an offset is provided at least on or in the fixed bearing, with the steering gear in the assembled state, the offset causing a pivoting movement of the helical pinion in relation to the helical gear, the pivoting movement being spring-loaded by the torsion.

5. The steering gear according to claim 1, wherein at least the helical pinion and/or the helical gear are dimensioned with respect to each other such that an offset forms which, with the steering gear in the assembled state, causes a pivoting movement of the helical pinion in relation to the helical gear, the pivoting movement being spring-loaded by the torsion.

6. A steering gear according to claim 1, wherein the mounting has a multi-piece design, wherein the annular section is produced as a first piece from a soft sheet metal, and the disk-shaped section is produced as a second piece from a spring steel sheet.

7. A steering gear according to claim 1, wherein the annular section has a crucible shape and comprises a cylindrical housing formed of soft sheet metal, which encloses the outer ring of the first rolling bearing.

8. A steering gear according to claim 1, wherein the annular section has a collar shape and carries the inner ring of the first rolling bearing.

9. A steering gear according to claim 1, wherein the disk-shaped section has a lug shape.

10. A steering gear according to claim 1, wherein further openings are provided in the annular or disk-shaped section of the mounting, in addition to the openings, the further openings being radially offset therefrom, whereby in addition to the mutually opposing land-shaped transition regions, further mutually opposing land-shaped transition regions are formed, which together create a fully cardanically elastic connection between the disk-shaped section and the crucible-shaped section.

11. A steering gear according to claim 1, wherein the housing section of the steering system is provided with at least one elastic damping element against which the axially movable mounting strikes.

12. A steering gear according to claim 1, wherein the disk-shaped section of the mounting is fixed in the housing section by means of an adjusting screw and/or a threaded ring.

13. A steering gear according to claim 1, wherein the second rolling bearing of the bearing device designed as a floating bearing is disposed in a bearing inner ring, which in turn is joined by an elastic land element to a bearing outer ring disposed in the housing section.

14. The steering gear according to claim 13, wherein the bearing inner ring is designed as a first bushing or inner bushing receiving the second rolling bearing, and the bearing outer ring is designed as a second bushing or outer bushing receiving the inner bushing, wherein a distance or space bridged by the land or land element is formed between the bushings.

15. The steering gear according to claim 14, wherein at least one elastic stop element that is produced from elastomer is disposed in the bearing outer ring or outer bushing, the bearing inner ring or the inner bushing striking against the stop element, during a load change that occurs in the steering gear.

16. The steering gear according to claim 15, wherein at least one of the stop elements is designed as a spring element that pushes on the second rolling bearing at least during a load change.

17. An electric power steering system, comprising a steering gear according to claim 1.

18. A method for producing a mounting in a steering gear according to claim 1, wherein the mounting is produced for installation on the fixed bearing side in a housing section of the steering gear, for which purpose the mounting comprises a disk-shaped section which is provided with the openings and relative to which the annular section pivots, wherein the annular section is either assembled with the outer ring of the first rolling bearing and the disk-shaped section is attached to the housing section, or the annular section is assembled with the inner ring of the first rolling bearing and the disk-shaped section is attached to the shaft the mounting is produced from a disk-shaped or lug-shaped section part made of a spring steel sheet, and a crucible-shaped section part made of a soft sheet metal, by positively and/or non-positively connecting the two section parts to each other, or apertures being present in the first sheet metal, with material of the second sheet metal being pushed through the apertures from the one side and then being formed from the opposite side, whereby a positive fit and/or non-positive fit connects the two section parts to each other, or apertures being present in the first sheet metal, with protruding regions of the crucible-shaped section part being placed through the apertures from the one side and then being formed from the opposite side, whereby a positive fit and/or non-positive fit connects the two section parts to each other

* * * * *